United States Patent
Lim et al.

(10) Patent No.: US 8,083,996 B2
(45) Date of Patent: Dec. 27, 2011

(54) THERMAL SIPHON REACTOR AND HYDROGEN GENERATOR HAVING THE SAME

(75) Inventors: Myong Hoon Lim, Yongin (KR); Tae Hee Park, Seoul (KR); Jae Hoi Gu, Seongnam (KR); Yongho Yu, Seongnam (KR)

(73) Assignee: Samsung Engineering Co., Ltd., Gangnam-Gu, Seoul (KR)

( * ) Notice: Subject to any disclaimer, the term of this patent is extended or adjusted under 35 U.S.C. 154(b) by 957 days.

(21) Appl. No.: 11/656,539

(22) Filed: Jan. 23, 2007

(65) Prior Publication Data

US 2007/0172403 A1 Jul. 26, 2007

Related U.S. Application Data

(60) Provisional application No. 60/766,504, filed on Jan. 24, 2006.

(51) Int. Cl.
*G05D 16/00* (2006.01)

(52) U.S. Cl. ........ 422/112; 422/177; 422/180; 422/636; 429/17; 429/19; 429/20; 429/21; 423/657; 423/648.1; 423/650; 423/651; 423/294; 423/295; 123/463; 123/457; 48/61; 48/127.9; 60/780

(58) Field of Classification Search .............. 48/61, 76, 48/197 R, 127.9; 423/651, 648.1; 422/129; 92/34, 90, 40–47; 137/510, 224–225
See application file for complete search history.

(56) References Cited

U.S. PATENT DOCUMENTS 3,554,707 A 1/1971 Holmes et al.
(Continued)

FOREIGN PATENT DOCUMENTS

WO WO 02/00547 1/2002
(Continued)

OTHER PUBLICATIONS

German Office Action issued in corresponding Application No. 11 2007 000 243.3-41 dated Sep. 16, 2009.
(Continued)

*Primary Examiner* — Kaity V. Handal
(74) *Attorney, Agent, or Firm* — Buchanan Ingersoll & Rooney PC

(57) ABSTRACT

Provided are a thermal siphon reactor and a hydrogen generator including the same. The hydrogen generator including the thermal siphon reactor includes: a housing; a reaction source container disposed in the housing; a reactor tube connected to the reaction source container in which a catalytic reaction of a reaction source provided from the reaction source container occurs; a catalyst layer which is porous, facilitates gas generation by being contacted with the reaction source, and is disposed in the reactor tube; and a product container which is connected to the reactor tube and collects a reaction product generated in the reactor tube, wherein in the reactor tube, a convection channel through which the reaction product is discharged passes through the reactor tube in the lengthwise direction of the reactor tube. The thermal siphon reactor and the hydrogen generator including the same have a self-operating ability, operate at low costs, and have small installment volume.

22 Claims, 8 Drawing Sheets

U.S. PATENT DOCUMENTS

| | | | |
|---|---|---|---|
| 5,887,554 A | 3/1999 | Cohn et al. | |
| 5,958,091 A * | 9/1999 | Sakai et al. | 48/61 |
| 6,047,728 A * | 4/2000 | Eidsmore | 137/505.42 |
| 6,548,029 B1 | 4/2003 | Towler et al. | |
| 6,737,184 B2 | 5/2004 | Rusta-Sellehy et al. | |
| 6,821,501 B2 | 11/2004 | Matzakos et al. | |
| 7,544,431 B2 * | 6/2009 | deVos et al. | 429/17 |
| 2003/0009942 A1 * | 1/2003 | Amendola et al. | 48/61 |
| 2005/0158595 A1 | 7/2005 | Marsh et al. | |
| 2006/0029539 A1 | 2/2006 | Dutta et al. | |

FOREIGN PATENT DOCUMENTS

| | | |
|---|---|---|
| WO | WO 02/00548 | 1/2002 |
| WO | WO 2004/085307 | 10/2004 |

OTHER PUBLICATIONS

Canadian Office Action dated May 28, 2010 in related Canadian Patent Application No. 2,637,921.

* cited by examiner

THERMAL SIPHON REACTOR AND HYDROGEN GENERATOR HAVING THE SAME

CROSS-REFERENCE TO RELATED PATENT APPLICATIONS

This application claim the benefit of U.S. Provisional Patent Application No. 60/766,504, filed on Jan. 24, 2006, in the U.S. Patent and Trademark Office, the disclosures of which is incorporated herein in its entirety by reference.

BACKGROUND OF THE INVENTION

1. Field of the Invention

The present invention relates to a thermal siphon reactor and a hydrogen generator including the same, and more particularly, to a thermal siphon reactor with self-operating ability and a hydrogen generator including the same.

2. Description of the Related Art

Technologically important gases, such as hydrogen and oxygen, have gained much attention due to the huge applications in the fields of energy, chemical and biotechnology. Although the conventional processes of their productions and separations in large quantity are well established, their small-scaled processes in the ways of cost effectiveness and high efficiency are still remained as a challenging issue.

In general, hydrogen can be provided to a fuel cell or a device using hydrogen through various methods. For example, hydrogen can be stored in the form of gas under high pressure for use, hydrogen can be stored in the form of liquid and then vaporized for use, hydrocarbons can be reformed to generate hydrogen and the hydrogen is provided, or hydrogen can be adsorbed to a hydrogen storing alloy and then desorbed for use.

Direct hydrogen storage methods are commonly used to store pure hydrogen in the form of gas or liquid. These methods require specialized and durable containers that are capable of bearing very high pressures and/or extremely low temperature.

Another common method of hydrogen generation is to use a catalytic steam reformer, which converts hydrocarbon to hydrogen and carbon dioxide. The major drawbacks of this method are time lag for starting due to the reforming process and unwanted byproducts, such as carbon monoxide and carbon dioxide. The adsorption methods for $H_2$ storage also have numerous problems including low hydrogen density per unit volume, deterioration of the hydrogen adsorption materials, and time lag for starting due to the slow desorption kinetics for $H_2$ generation, and so on. Recently, hydrogen generation from aqueous sodium borohydride solution using a catalyst has stirred many interests in scientific communities since it is not only stable in normal operation condition, but also releases hydrogen gas in safe and controllable way. In spite of several advantages of using sodium borohydride for hydrogen generation, hydrogen generation systems using this technology necessitate further developments in the aspect of high efficiency, reduced space for installation, and convenience.

Conventional gas generation apparatuses often have auxiliary equipments, such as a pump and a heater, which are used for reactant delivery and a heating source, respectively. These auxiliary equipments lower efficiency of energy utilization overall.

SUMMARY OF THE INVENTION

The present invention provides a thermal siphon reactor with self-operating ability and a hydrogen generator including the same.

The present invention also provides a thermal siphon reactor having low operation costs and a hydrogen generator including the same.

The present invention also provides a thermal siphon reactor requiring small installment space and a hydrogen generator including the same.

According to an aspect of the present invention, there is provided a thermal siphon reactor including: a reactor tube in which a catalytic reaction of a reaction source occurs; and a catalyst layer which is porous, facilitates gas generation by being contacting with the reaction source, and is disposed in the reactor tube, wherein in the reactor tube, a convection channel penetrating the reactor tube is formed in the lengthwise direction of the reactor tube and reaction products are discharged through the convection channel.

The reaction source may be a sodium borohydride solution.

The gas generated in the reactor tube may be hydrogen.

The reaction occurring in the reactor tube may be an exothermic reaction.

The reactor tube may have a shape of a cylinder having a hollow.

The catalyst layer may have a shape of a porous matrix.

The catalyst layer may have at least one hollow which forms a convection channel.

The catalyst layer may be cylindrical or cubical prism and have a smaller width than the reactor tube, and a space between the reactor tube and the catalyst layer forms the convection channel.

The thermal siphon reactor further includes an insulating layer covering an external surface of the reactor tube.

The thermal siphon reactor further includes a liquid absorption pad which is separably attached to a lower end of the reactor tube, and absorbs a liquid reaction source and transfers the liquid reaction source to the catalyst layer.

According to an aspect of the present invention, there is provided a hydrogen generator including: a housing; a reaction source container disposed in the housing;

a reactor tube connected to the reaction source container in which a catalytic reaction of a reaction source provided from the reaction source container occurs;

a catalyst layer which is porous, facilitates gas generation by being contacted with the reaction source, and is disposed in the reactor tube; and a product container which is connected to the reactor tube and collects a reaction product generated in the reactor tube, wherein in the reactor tube, a convection channel penetrating the reactor tube is formed in the lengthwise direction of the reactor tube and reaction products are discharged through convection channel.

The hydrogen generator further includes a control unit which re-provides a reaction source provided from the reaction source container to the reaction tube, and is separably attached to a lower end of the reactor tube between the reaction source container and the reactor tube.

The control unit includes: a bellows transferring the reaction source provided from the reaction source container to the reactor tube; and a liquid absorption pad which is separably attached to a lower end of the reactor tube, and absorbs a liquid reaction source and transfers the absorbed liquid reaction source to the catalyst layer, wherein the bellows expands or contracts according to the pressure of the reactor tube so that the liquid absorption pad is attached to or separated from the lower end of the reactor tube.

The hydrogen generator further includes a reaction source conduit which is disposed between the reaction source container and the reactor tube and comprises an open/close valve and a back flow preventing valve, wherein the open/close valve is positioned closer to the reaction source container than the back flow preventing valve.

The hydrogen generator further includes a gas discharge conduit connected to the product container so as to discharge the gas in the product container, and a gas-liquid separation membrane disposed between the product container and the gas discharge conduit.

The reaction source container may be an inner space of the housing.

The reaction source container may be formed of a flexible film and separably built in the housing.

The product container may be formed of a flexible film and separably built in the housing.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1A:
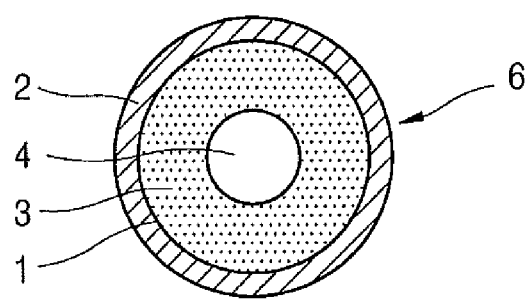
FIG. 1A through FIG. 1C are sectional views of thermal siphon reactors according to embodiments of the present invention.
Figure 1A:
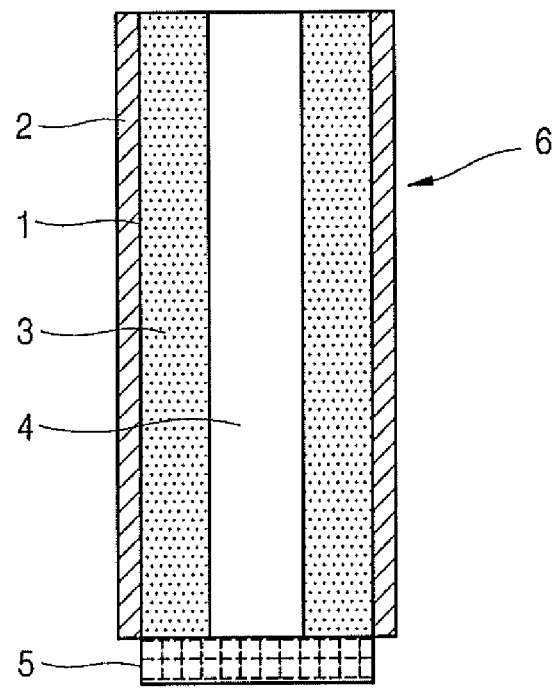
Figure 1B:
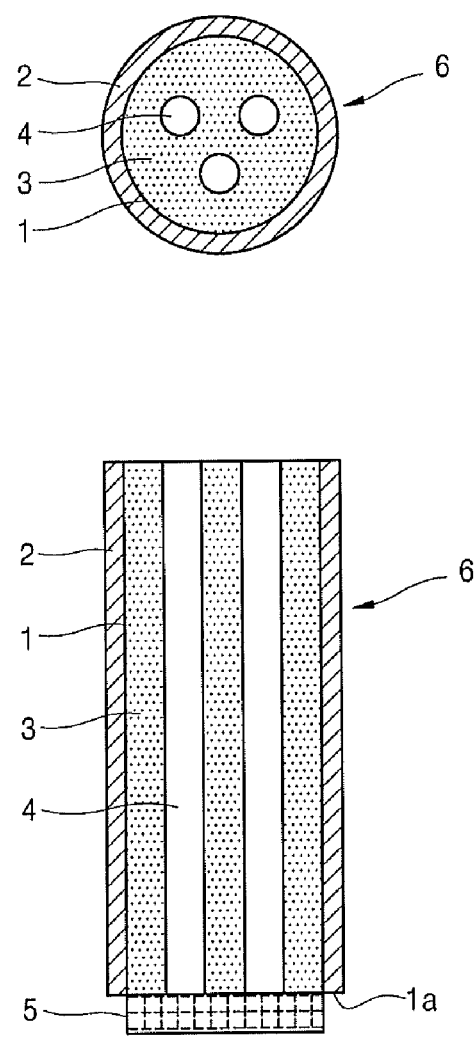
Figure 1C:
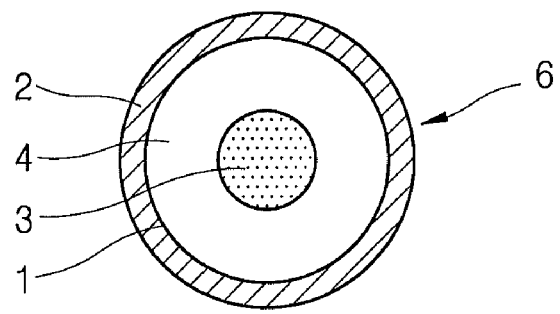
Figure 1C:
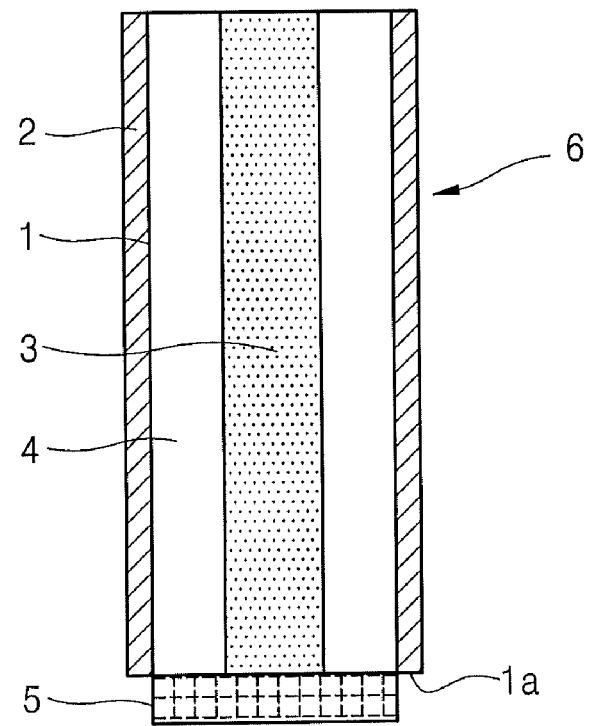

FIG. 1A through FIG. 1C are sectional views of thermal siphon reactors according to embodiments of the present invention. More specifically, respective drawings are the cross-sectional and vertical-sectional views of a thermal siphon reactor.

Referring to FIG. 1, a thermal siphon reactor 6 according to an embodiment of the present invention includes a reactor tube 1, a catalyst layer 3, a convection channel 4, a liquid absorption pad 5, and an insulating layer 2.

The thermal siphon reactor 6 is a reactor using a thermal siphon effect. The thermal siphon effect is known as a phenomenon that induces fluid flow on account of a natural convection process resulted from heat transfer. Most applications of thermal siphon effect have been found in the fields of solar cells and water circulation devices. The combination of this thermal siphon effect and a catalytic reaction process makes possible to create a pumpless catalytic reactor. In our best knowledge, its direct applications of chemical reactor have not been reported or found in any articles or literatures. In this regard, the present invention relates to a thermal siphon reactor with high conversion rate without an external power source and a hydrogen generator including the thermal siphon reactor.

A reaction source is provided to the reactor tube 1 and a catalyst reaction occurs therein. The reactor tube 1 can be formed a known material in the art, such as stainless steel. In the current embodiment, the reactor tube 1 is cylindrical and has a hollow. However, the shape of the reactor tube 1 is not limited thereto. For example, the reactor tube 1 may have a shape of rectangle or pentagon. In the current embodiment, the reaction source is a sodium borohydride solution, which is used to generate gaseous hydrogen. However, the reaction source can be any material that generates gaseous hydrogen. The catalyst reaction refers to a reaction occurring by operation of a catalyst. The catalyst is a substance that causes a chemical reaction to happen more quickly or slowly but is not affected by itself.

The catalyst layer 3 which contacts the reaction source to generate gas is disposed in the reactor tube 1. The catalyst layer 3 may have the shape of a porous matrix, but is not limited thereto. That is, the catalyst layer 3 may be formed of porous metal, porous metal oxides, porous metal borides, impregnated homogeneous catalyst in porous media, ceramic materials, inorganic acid, organic acid, silica, alumina, zeolite, glasses, fabrics, woven, nonwoven, cements, and mixtures thereof. As illustrated in FIGS. 1A and 1B, the catalyst layer 3 may have at least one hollow, which forms a convection channel 4 through which a reaction product is discharged. In FIG. 1A, the catalyst layer 3 has one hollow and thus has one convection channel 4. In FIG. 1B, the catalyst layer 3 has three hollows and thus has three convection channels 4. That is, in FIG. 1A and FIG. 1B, the convection channel 4 is disposed inside the catalyst layer 3. Referring to FIG. 1C, a catalyst layer 3 is cylindrical and has a smaller diameter than a reactor tube 1, and a convection channel 4 is a space between the reactor tube 1 and the catalyst layer 3. That is, the catalyst layer 3 having a smaller width, that is, a smaller diameter than the reactor tube 1 is disposed inside the reactor tube 1 such that the catalyst layer 3 and the reactor tube 1 form concentric circles. Therefore, there is a space between the catalyst layer 3 and the reactor tube 1, and the space is a convection channel 4. The number and size of the convection channel 4 can be varied depending on the flow rate of gas and types of gas and by-products. As illustrated in FIG. 1A through FIG. 1C, the convection channel 4 is formed passing through the reactor tube 1 in a lengthwise direction of the reactor tube 1.

A liquid absorption pad 5 is separably attached to a lower end 1a of the reactor tube 1. That is, when a pressure inside the reactor tube 1 is lower than a predetermined level, the liquid absorption pad 5 is attached to the reactor tube 1, on the other hand, when a pressure inside the reactor tube 1 is higher than a predetermined level, the liquid absorption pad 5 is separated from the reactor tube 1. The attachment of the liquid absorption pad 5 to the reactor tube 1 or the separation of the liquid absorption pad 5 from the reactor tube 1 will be described in detail later. The liquid absorption pad 5 absorbs the reaction source in a liquid phase and transfers the absorbed liquid reaction source to the catalyst layer 3. In addition, the liquid absorption pad 5 prevents back release of gas and by-product from the reactor tube 1. The liquid absorption pad 5 may be formed of any synthetic or non-synthetic fibers or fabrics, sponges, porous ceramic, porous metals, porous polymers or mixture thereof.

The insulating layer 2 surrounds an external surface of the reactor tube 1. The insulating layer 2 blocks the heat transfer from the reactor tube 1 to an external gas, and thus heat inside the reactor tube 1 is not dissipated. The insulating layer 2 may be formed of any material having excellent heat insulating properties known in the art.

An operational principle of the thermal siphon reactor 6 will now be described in detail.

First, a reaction source is socked in the liquid absorption pad 5.

Then, the reaction source is transferred to the catalyst layer 3 which contacts the liquid absorption pad 5 via capillary and wetting force.

The reaction source is reacted by being contacted with the catalyst layer 3, which causes to elevate the temperature of the reactor tube 1 due to exothermic reaction. The heat generated in the reactor tube 1 causes a temperature gradient between the reactor tube 1 and the liquid absorption pad 5 and thus the transfer of the reaction source into the reactor tube 1 is facilitated. If the heat from the catalytic reaction is not sufficient enough for self-operation of the thermal siphon reactor 6, the thermal siphon reactor 6 may be heated by an external heating source (not shown.) In the current specification, the self-operation refers to automatic transferring of the reaction source into the reactor tube 1 without pumps, by thermal siphon effect. The temperature inside the reactor tube 1 can be maintained constant by the insulating layer 2 covering the outside of the reactor tube 1.

During the catalytic reaction in the reactor tube 1, a great amount of the reaction source is converted to gas and by-product.

Then, the generated gas, by-product, and non-reacted reaction source are discharged to the outside of the thermal siphon reactor 6 through the convection channel 4.

Figure 2:
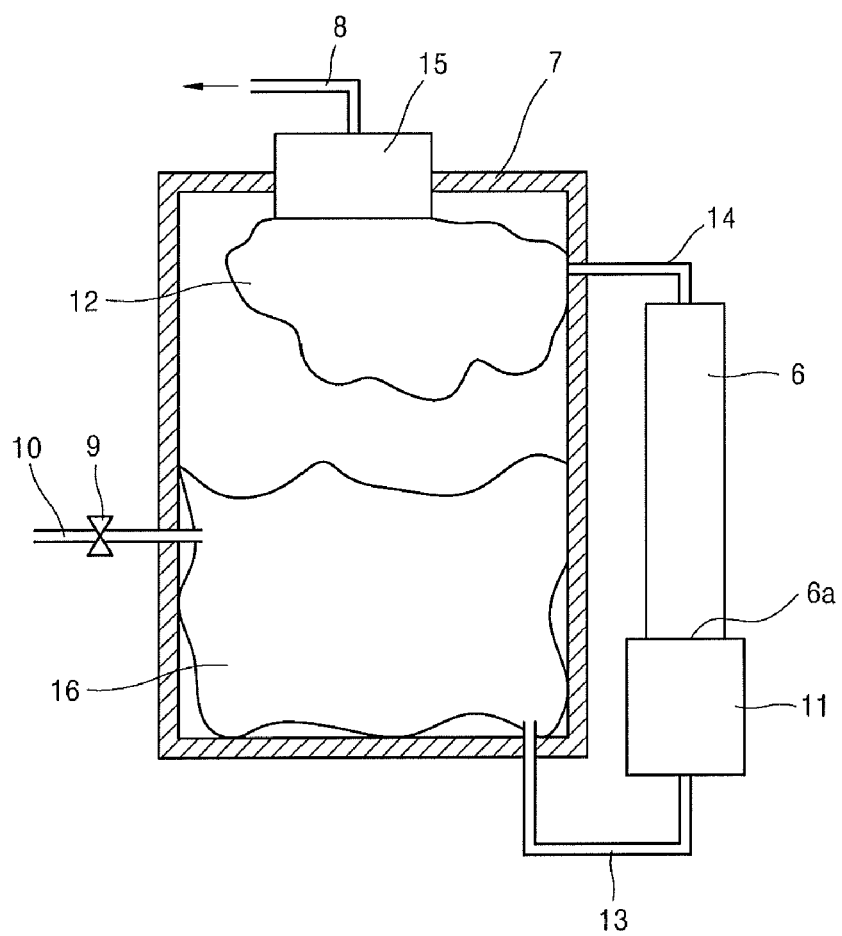
FIG. 2 is a view of a hydrogen generator including a thermal siphon reactor according to an embodiment of the present invention.
Figure 3A:
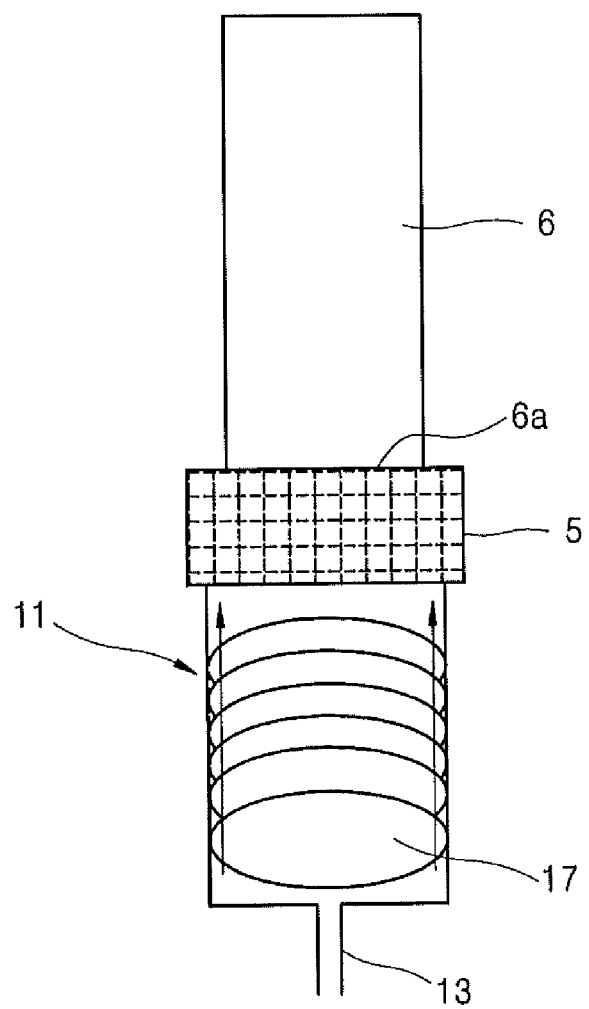
FIGS. 3A and 3B are views illustrating the structure and operation of a control unit of FIG. 2.
Figure 3B:
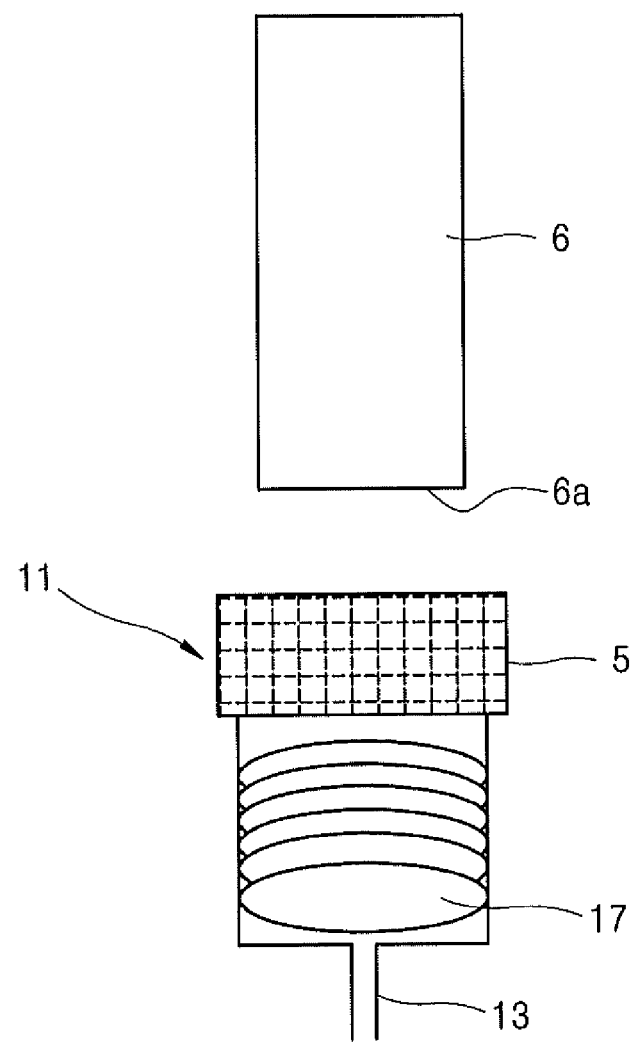

FIG. 2 is a view of a hydrogen generator including a thermal siphon reactor according to an embodiment of the present invention, and FIGS. 3A and 3B are views illustrating the structure and operation of a control unit of FIG. 2. In FIGS. 1A through 1C, 2, and 3A and 3B, the same numeral references denote the same members.

Referring to FIG. 2, FIG. 3A, and FIG. 3B, a hydrogen generator according to an embodiment of the present invention includes a housing 7, a reaction source container 16, a control unit 11, a thermal siphon reactor 6, a product container 12, and a gas-liquid separation membrane 15.

The housing 7 stores a reaction source and a reaction product, and may be formed of metal or non-metal.

The reaction source container 16 stores the reaction source, and is installed inside the housing 7. The reaction source container 16 may be formed of a flexible film, so that during the reaction process, when the volume of the reaction source container 16 decreases as the reaction source is consumed, the housing 7 has a more space. A reaction source conduit 10 is connected to one side of the reaction source container 16 and the reaction source is injected via a valve 9.

A control unit 11 is connected to the reaction source container 16 via a reaction source conduit 13, and re-provides the reaction source provided from the reaction source container 16 to the thermal siphon reactor 6. The control unit 11 includes a bellows 17 and a liquid absorption pad 5. The bellows 17 expands or contracts according to the pressure inside the thermal siphon reactor 6 so that the liquid absorption pad 5 is attached to or separated from a lower end 6a of the thermal siphon reactor 6. The bellows 17 may be formed of a known material in the art, such as silicon or rubber. In FIG. 3A, the control unit 11, more specifically, the liquid absorption pad 5 is attached to the lower end 6a of the thermal siphon reactor 6 so that the reaction source is continuously provided to the thermal siphon reactor 6. In FIG. 3B, the control unit 5 is separated from the lower end 6a of the thermal siphon reactor 6 so that the supply of the reaction source stops. FIG. 3A illustrates a case in which the pressure inside the thermal siphon reactor 6 is within a predetermined level, FIG. 3B illustrates a case in which the pressure inside the thermal siphon reactor 6 is higher than a predetermined level.

The thermal siphon reactor 6 consists of a reactor tube, a catalyst layer, and a convection channel, as illustrated in FIGS. 1A through 1C. The reactor tube, the catalyst layer, and the convection channel are already described above.

The product container 12 stores a reaction product produced from the thermal siphon reactor 6 and is built in the housing 7. The product container 12 is connected to the thermal siphon reactor 6 through the product conduit 14, more specifically, connected to the reactor tube 1 so that the reaction product generated from the reactor tube 1 is provided to the product container 12. The product container 12 may be formed of a flexible film, so that during the reaction process, as the amount of the reaction product increases, the volume of the container 12 increases but a space inside the housing 7 decreases.

The gas-liquid separation membrane 15 is disposed on one side of the product container 12 and separates gas alone from the reaction product. A gas, such as hydrogen, included in the product container 12 passes the gas-liquid separation membrane 15 and then discharged through a gas discharge conduit 8.

An operational principle of the hydrogen generator will now be described in detail.

First, the reaction source is provided from the reaction source container 16 to the control unit 11 through the reaction source conduit 13.

Then, the reaction source provided to the control unit 11 is provided to the thermal siphon reactor 6 after sequentially passing the bellows 13 and the liquid absorption pad 5. In the control unit 11, the reaction source is converted to gas and by-product by the catalytic reaction.

The reaction product including gas, by-product, and an unreacted reaction source are discharged from the thermal siphon reactor 6 and then flow to the product container 12 through the product conduit 14. A back flow preventing valve (now shown) may be built in the product conduit 14.

A gas, such as hydrogen, included in the reaction product of the product container 12 passes the gas-liquid separation membrane 15 and then is discharged through the gas discharge conduit 8. On the other hand, liquid and solid does not passes through the gas-liquid separation membrane 15 and remain in the product container 12.

Meanwhile, as the reaction is processed, the reaction source is consumed and thus the volume of the reaction source container 16 decreases but the volume of the product container 12 increases due to an increase in the amount of the reaction product. That is, when the volume of the reaction source container 16 decreases, the volume of the product container 12 increases, so that a substantial decrease in the entire space inside the housing 7 can be prevented and thus the hydrogen generator occupies much smaller space.

Meanwhile, when the amount of the reaction product increases over the reaction, the pressure of the thermal siphon reactor 6 increases. When the pressure of the thermal siphon reactor 6 is higher than a predetermined level, the bellows 17 inside the control unit 11 contracts and the liquid absorption pad 5 connected to the bellows 17 is separated from the thermal siphon reactor 6, so that the supply of the reaction source to the thermal siphon reactor 6 stops and the reaction does not occur. When the liquid absorption pad 5 is separated from the thermal siphon reactor 6, the pressure of the thermal siphon reactor 6 quickly decreases to an atmospheric pressure, so that the contracted bellows 17 is expanded to its original shape and the liquid absorption pad 5 is again attached to the thermal siphon reactor 6. Therefore, the reaction source is supplied to the thermal siphon reactor 6 again and the reaction occurs.

The present invention will be described in further detail with reference to the following examples. These examples are for illustrative purposes only and are not intended to limit the scope of the present invention.

Experimental Examples (Preparation of Thermal Siphon Reactor)

A thermal siphon reactor 6 was prepared by filling cobalt-iron mixture metal catalyst layer 3 in the reactor tube 1 formed of stainless steel and performing a thermal oxidation of the metal catalyst layer 3. The reactor tube 1 has a length of 6 cm and a width of ½ inch. As illustrated in FIG. 1A, the catalyst layer 3 had one hollow and was cylindrical. The diameter of the hollow, that is, the diameter of a convection channel 4 was 0.5 cm. The reactor tube 1 filled with the catalyst layer 3 was heated at 600☐ for 2 hours in the air. Alternatively, the reactor tube 1 filled with the catalyst layer 3 was heated by a butane torch for 10 to 20 minutes.

(Hydrogen Generation Experiments)

Figure 4:
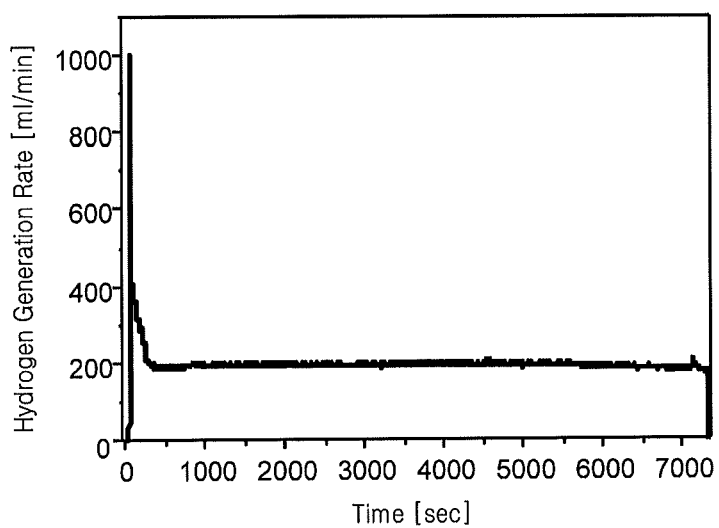
FIG. 4 is a graph of a hydrogen generation rate with respect to time measured using a thermal siphon reactor according to an embodiment of the present invention.

Hydrogen generation experiments were carried out to measure a flow rate of hydrogen. First, a thermal siphon reactor 6 including a mixed Co/Fe oxide metal layer 3 was built in a reaction vessel, and then 50 ml of a sodium borohydride solution containing 20 wt % $NaBH_4$, 5 wt % NaOH, and 75 wt % distilled water was added to the reaction vessel. Once reaction started, the sodium borohydride solution was fed to one side of the thermal siphon reactor 6 automatically without external pumping. Hydrogen, water and solid waste came out from the other side of the thermal siphon reactor 6. The hydrogen flow rate was measured using a mass flow controller interfaced with a personal computer (PC.) FIG. 4 is a graph of hydrogen generation rate of hydrogen generated in the current experiment with respect to time. Referring to FIG. 4, when the reaction started, the hydrogen generation rate quickly increases to 1,000 ml/min and then after about 400 seconds, the hydrogen generation rate was maintained at about 200 ml/min.

Figure 5:
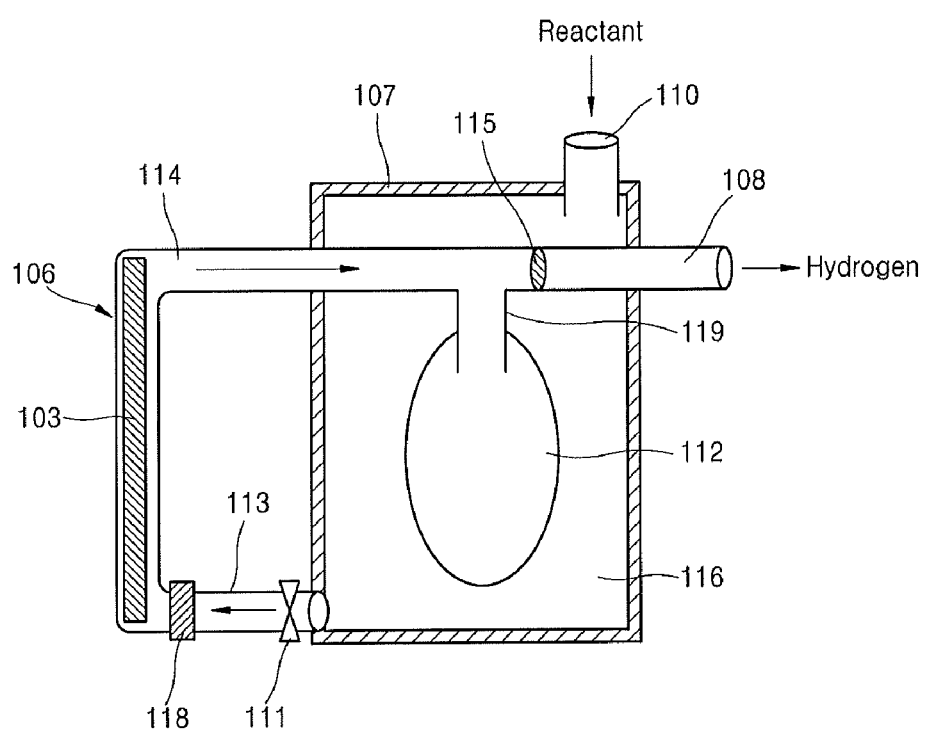
FIG. 5 is a view of a hydrogen generator including a thermal siphon reactor according to another embodiment of the present invention.

FIG. 5 is a view of a hydrogen generator including a thermal siphon reactor according to another embodiment of the present invention.

The hydrogen generator includes a housing 107, a reaction source container 116, an open/close valve 111, a back flow preventing valve 118, a thermal siphon reactor 106, a product container 112, and a gas-liquid separation membrane 115.

A reaction source conduit 110 is connected to one side of the housing 107.

The reaction source container 116 is an inner space covered by the housing 107. That is, in the current embodiment, the reaction source container 116 is an inner space of the housing 107 itself, not a structure separably built in the housing 107.

The open/close valve 111 and the back flow preventing valve 118 are disposed in the reaction source conduit 113 connecting the reaction source container 116 to the thermal siphon reactor 106, and provide a reaction source to the thermal siphon reactor 106. The back flow preventing valve 118 prevents back flow of the reaction product generated in the thermal siphon reactor 106 to the reaction source container 116.

The thermal siphon reactor 106 includes a reactor tube, a catalyst layer 103, and a convection channel, as illustrated in FIGS. 1A through 1C, and description for these members is already described.

The product container 112 stores a reaction product generated from the thermal siphon reactor 106, and is built in the housing 107. The product container 112 is connected to the thermal siphon reactor 106 sequentially through a by-product conduit 119 and a product conduit 114, and provided with a reaction product. The product container 112 may be formed of a flexible film, so that as the reaction product inside the reaction container 112 increases, the volume of the reaction container 112 increases and a space inside the housing 107 decreases. The by-product conduit 119 is branched from the product conduit 114.

The gas-liquid separation membrane 115 is disposed in a latter end of the product conduit 114, that is, disposed after a part of the product conduit 114 from which the by-product conduit 119 is branched, and separates gas alone from the reaction product. The gas, such as hydrogen, included in the reaction product passes the gas-liquid separation membrane 115 and then is discharged through a gas discharge conduit 108.

An operational principle of the hydrogen generator will now be described in detail.

First, a reaction source is flowed from the reaction source container 116 to reaction source conduit 113.

The reaction source flowed to the reaction source conduit 113 moves to the thermal siphon reactor 106 after sequentially passing through the open/close valve 111 and the back flow preventing valve 118. In the thermal siphon reactor 106, the reaction source is converted to gas and by-product by a catalytic reaction.

The reaction product including gas, by-product, and unreacted reaction source is discharged from the thermal siphon reactor 106 and flows to the product container 112 sequentially through the product conduit 114 and the by-product conduit 119.

The gas, such as hydrogen, included in the reaction product inside the product container 112 passes the gas-liquid separation membrane 115 and is discharged through the gas discharge conduit 108. On the other hand, liquid and solid does not pass the gas-liquid separation membrane 115 and remains in the product container 112.

Meanwhile, as the reaction is processed, the reaction source is consumed and thus the volume of the reaction source container 116 decreases but the volume of the product container 112 increases due to an increase in the amount of the reaction product. That is, when the volume of the reaction source container 116 decreases, the volume of the product container 112 increases, so that a substantial decrease in the entire space inside the housing 107 can be prevented and thus the hydrogen generator occupies much smaller space.

In addition, as the reaction is processed, when the amount of the reaction product increases, the pressure of the thermal siphon reactor 106 increases. When the pressure of the thermal siphon reactor 106 is higher than a predetermined level and thus affects one side of the back flow preventing valve 118, that is, a side of the back flow preventing valve 118 facing the thermal siphon reactor 106, the back flow preventing valve 118 is closed. In this case, supply of the reaction source to the thermal siphon reactor 106 stops and the reaction stops. Meanwhile, the gas, such as hydrogen, included in the reaction product discharged from the thermal siphon reactor 106 is discharged through the gas-liquid separation membrane 115, and thus the pressure in the thermal siphon reactor 106 decreases over time. Accordingly, the pressure affecting one side of the back flow preventing valve 118, that is, a side of the back flow preventing valve 118 facing the thermal siphon reactor 106 decreases over time, and thus the back flow preventing valve 118 is opened again. As a result, the reaction source is provided to the thermal siphon reactor 106 again and the reaction occurs.

A thermal siphon reactor having the structure described above according to an embodiment of the present invention and a hydrogen generator including the thermal siphon reactor self-operates without pumps, and automatically controls hydrogen generation. Accordingly, the thermal siphon reactor and the hydrogen generator including the same can operate at low costs.

The present invention provides a thermal siphon reactor with self-operating ability and a hydrogen generator including the same.

The present invention also provides a thermal siphon reactor having low operation costs and a hydrogen generator including the same.

The present invention also provides a thermal siphon reactor requiring small installment space and a hydrogen generator including the same.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A thermal siphon reactor comprising:
   a reactor tube in which a catalytic reaction of a reaction source occurs;
   a catalyst layer which is porous, facilitates gas generation by being contacted with the reaction source, and is disposed in the reactor tube; and
   a liquid absorption pad which is separably attached to a lower end of the reactor tube, and absorbs a liquid reaction source and transfers the liquid reaction source to the catalyst layer,
   wherein the liquid absorption pad is attached to the lower end of the reactor tube when a pressure inside the reactor tube is lower than a predetermined level, and the liquid absorption pad is separated from the lower end of the reactor tube when a pressure inside the reactor tube is higher than a predetermined level,
   wherein, in the reactor tube, at least one hollow cylindrical through hole extending from one end of the reactor tube to another end of the reactor tube, and wherein at least a side of the hollow cylindrical through hole is formed by said catalyst layer, and said hollow cylindrical through hole forming a convection channel through which a reaction product is discharged passes through the reactor tube in the lengthwise direction of the reactor tube.

2. The thermal siphon reactor of claim 1, wherein the reaction source is a sodium borohydride solution.

3. The thermal siphon reactor of claim 1, wherein the gas generated in the reactor tube is hydrogen.

4. The thermal siphon reactor of claim 1, wherein the reaction occurring in the reactor tube is an exothermic reaction.

5. The thermal siphon reactor of claim 1, wherein the reactor tube has a shape of a cylinder having a cylindrical through hole.

6. The thermal siphon reactor of claim 1, wherein the catalyst layer has a shape of a porous matrix.

7. The thermal siphon reactor of claim 1, wherein the catalyst layer is cylindrical or cubical prism and has a smaller width than the reactor tube, and a space between the reactor tube and the catalyst layer forms the convection channel.

8. The thermal siphon reactor of claim 1, further comprising an insulating layer covering an external surface of the reactor tube.

9. The thermal siphon reactor of claim 1, wherein the hollow cylindrical through hole is of uniform cross section.

10. A hydrogen generator comprising:
    a housing;
    a reaction source container disposed in the housing;
    a reactor tube connected to the reaction source container in which a catalytic reaction of a reaction source provided from the reaction source container occurs;
    a catalyst layer which is porous, facilitates gas generation by being contacted with the reaction source, and is disposed in the reactor tube;
    a product container which is connected to the reactor tube and collects a reaction product generated in the reactor tube; and
    a control unit which re-provides a reaction source provided from the reaction source container to the reaction tube, and is separably attached to a lower end of the reactor tube between the reaction source container and the reactor tube,
    wherein the control unit comprising:
    a bellows transferring the reaction source provided from the reaction source container to the reactor tube; and
    a liquid absorption pad which is separably attached to a lower end of the reactor tube, and absorbs a liquid reaction source and transfer the absorbed liquid reaction source to the catalyst layer,
    wherein the bellows expands or contracts according to the pressure of the reactor tube so that the liquid absorption pad is attached to the lower end of the reactor tube when a pressure inside the reactor tube is lower than a predetermined level, and the liquid absorption pad is separated from the lower end of the reactor tube when a pressure inside the reactor tube is higher than a predetermined level,
    wherein, in the reactor tube, at least one hollow cylindrical through hole extending from one end of the reactor tube to another end of the reactor tube, and wherein at least a side of the hollow cylindrical through hole is formed by said catalyst layer, and said hollow cylindrical through hole forming a convection channel through which the reaction product is discharged passes through the reactor tube in the lengthwise direction of the reactor tube.

11. The hydrogen generator of claim 10, wherein the reaction source is a sodium borohydride solution.

12. The hydrogen generator of claim 10, wherein the reaction occurring in the reactor tube is an exothermic reaction.

13. The hydrogen generator of claim 10, wherein the reactor tube has a shape of a cylinder having a hollow cylindrical through hole.

14. The hydrogen generator of claim 10, wherein the catalyst layer has a shape of a porous matrix.

15. The hydrogen generator of claim 10, wherein the catalyst layer is cylindrical and has a smaller width than the reactor tube, and a space between the reactor tube and the catalyst layer forms the convection channel.

16. The hydrogen generator of claim 10, further comprising an insulating layer covering an external surface of the reactor tube.

17. The hydrogen generator of claim 10, further comprising a reaction source conduit which is disposed between the reaction source container and the reactor tube and comprises an open/close valve and a back flow preventing valve, wherein the open/close valve is positioned closer to the reaction source container than the back flow preventing valve.

18. The hydrogen generator of claim 10, further comprising a gas discharge conduit connected to the product container so as to discharge the gas in the product container, and a gas-liquid separation membrane disposed between the product container and the gas discharge conduit.

19. The hydrogen generator of claim 10, wherein the reaction source container is an inner space of the housing.

20. The hydrogen generator of claim 10, wherein the reaction source container is formed of a flexible film and is separably built in the housing.

21. The hydrogen generator of claim 10, wherein the product container is formed of a flexible film and is separably built in the housing.

22. The hydrogen generator of claim 10, wherein the hollow cylindrical through hole is of uniform cross section.

* * * * *